United States Patent [19]

Giammarrusco

[11] Patent Number: 4,585,907

[45] Date of Patent: Apr. 29, 1986

[54] SPEECH SYNTHESIZED TELEPHONE ANSWERING CIRCUIT

[75] Inventor: David P. Giammarrusco, Bartlett, Ill.

[73] Assignee: GTE Automatic Electric Incorporated, Northlake, Ill.

[21] Appl. No.: 558,213

[22] Filed: Dec. 5, 1983

[51] Int. Cl.[4] .......................... G10L 9/14; H04M 1/64
[52] U.S. Cl. ...................................... 179/18 B; 179/89
[58] Field of Search .................. 179/18 B, 89, 84 C, 179/5 P, 2 A, 27 FG, 27 FH; 381/51

[56] References Cited

U.S. PATENT DOCUMENTS

| | | | |
|---|---|---|---|
| 3,898,396 | 8/1975 | Gushue et al. | 179/175.3 A |
| 4,054,756 | 10/1977 | Comella et al. | 179/18 B |
| 4,327,251 | 4/1982 | Fomenko et al. | 179/18 B X |
| 4,359,607 | 11/1982 | Hannig et al. | 179/6.03 |
| 4,389,546 | 6/1983 | Glisson et al. | 179/18 B |
| 4,431,086 | 2/1984 | Moser et al. | 187/29 R |
| 4,489,438 | 12/1984 | Hughes | 381/51 |

FOREIGN PATENT DOCUMENTS 0028466  2/1982 Japan ................................. 179/2 A

OTHER PUBLICATIONS

"Desktop System Talks on Phone", *Electronics*, Jan. 27, 1983, p. 141.

*Primary Examiner*—Thomas W. Brown
*Attorney, Agent, or Firm*—Gregory G. Hendricks

[57] ABSTRACT

A speech synthesized answering circuit for use with a telepone subscriber station. A microprocessor control circuit monitors a telephone line for detection of a predetermined number of ringing signal bursts. A read-only-memory contains a vocabulary of digitized words. The microprocessor answers the line and forms a telephone answering message by retrieving selected digitized words from the read-only-memory. This message is transferred to a speech processor which converts it to analog format and couples it onto the calling telephone line.

7 Claims, 6 Drawing Figures

SPEECH SYNTHESIZED TELEPHONE ANSWERING CIRCUIT

CROSS-REFERENCE TO RELATED APPLICATION

The present application is related to the following co-pending and commonly assigned U.S. patent application, Ser. No. 558,061, now U.S. Pat. No. 4,547,630, entitled "SPEECH SYNTHESIZED TIME ANNOUNCEMENT CIRCUIT". This related application was concurrently filed with the present application and they were both filed in the name of the same inventor.

FIELD OF THE INVENTION

The present invention relates to telephone answering circuits and more particularly to a speech synthesized arrangement for providing automatic telephone answering messages.

BACKGROUND OF THE INVENTION

Previous methods of forming telephone service related speech messages were costly and unreliable. These messages were typically recorded on magnetic tape and then played through a mechanical player and coupled onto a telephone line. In order to change a message it had to be re-recorded on the magnetic tape. Such an arrangement is burdensome and inflexible in a changing environment.

SUMMARY OF THE INVENTION

In accordance with the present invention, a voice synthesized telephone answering circuit is provided for use in a communication system which includes a calling telephone station and a telephone line. The calling telephone station is operative to cause the communication system to apply a ringing signal to the telephone line.

The telephone answering circuit comprises vocabulary storage means which is operative to store digital representations of a predetermined group of words, a ringing detector which is connected to the telephone line and is operative in response to the ringing signal to provide a ringing detected signal, and a control processor connected to the ringing detector and the vocabulary storage means, and operative in response to the ringing detected signal to retrieve selected ones of the digital words from the vocabulary storage means, and further operative to concatenate the retrieved words into a digital telephone answering messsage.

The time announcement circuit further comprises a speech processor connected to the control processor. The control processor is further operative to transmit the digital telephone answering message to the speech processor, and the speech processor is operative in response to the digital telephone answering message to apply a corresponding analog telephone answering message to the telephone line.

Thus, the calling telephone station receives a voice synthesized telephone answering message in response to causing application of ringing current to the telephone line.

DESCRIPTION OF THE PREFERRED EMBODIMENT

Figure 1:
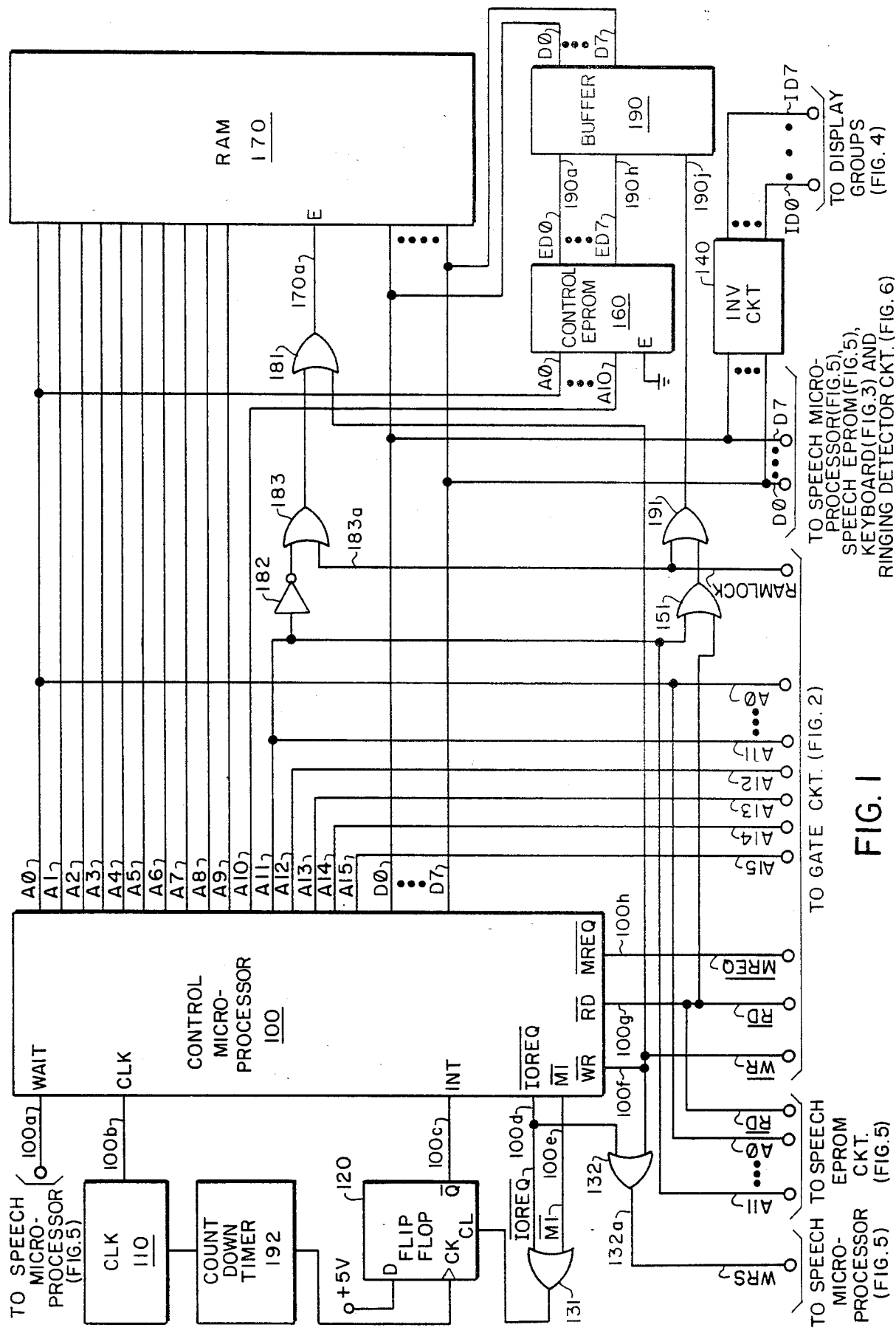
FIG. 1 is a combined logic and block diagram of the microprocessor control circuit of the present invention.

Referring now to FIG. 1 of accompanying drawing, the microprocessor control circuit of the present invention is shown. This circuit includes control microprocessor 100 which is connected to the speech microprocessor (FIG. 5) via wait lead 100a, to clock circuit 110 via clock lead 100b, to D-type flip-flop 120 via interrupt lead 100c, to OR gate 131 via I/O request ($\overline{IORQ}$) and $\overline{M1}$ control leads 100d and e, respectively, to OR gate 132 via I/O request ($\overline{IORQ}$) and write ($\overline{WR}$) leads 100d and f, respectively, and to the gate circuit (FIG. 2) via address leads A0–A15 and read ($\overline{RD}$), write ($\overline{WR}$) and memory request ($\overline{MREQ}$) leads 100g, 100f, and 100h, respectively.

Control microprocessor 100 is also connected to the electrically alterable programmable read only memory (EPROM) circuit (FIG. 5) via read ($\overline{RD}$) lead 100g and address leads A0–A11, to inverter circuit 140 via data leads D0–D7, to the speech microprocessor and speech EPROM (FIG. 5), keyboard circuits (FIG. 3) and ringing detector circuit (FIG. 6) via data leads D0–D7, to OR gate 151 via read ($\overline{RD}$) lead 100g and address lead A11 to EPROM circuit 60 via address leads A0–A10 to random access memory (RAM) 170 by data leads D0–D7 and address leads A0–A15, to OR gate 181 by write ($\overline{WR}$) lead 100f and to inverter 182 by address lead A11.

OR gate 183 is connected to the gate circuit (FIG. 2) via RAM-lock lead 183a and to inverter 182. OR gate 181 is further connected to OR gate 183 and to the enable (E) input of RAM 170 via lead 170a. Buffer circuit 190 is connected to EPROM 160 via EPROM data leads ED0–ED7 and to control microprocessor 100 via data leads D0–D7. OR gate 191 is connected to the gate circuit (FIG. 2) by RAM-lock lead 183a and to OR gate 151. OR gate 191 is further connected to buffer 190 by enable lead 190j. Inverter circuit 140 is connected to the display groups (FIG. 4) by inverter data leads ID0–ID7. OR gate 132 is further connected to the speech microprocessor (FIG. 5) via write speech microprocessor ($\overline{WRS}$) lead 132a. Count down timer 192 is connected between clock circuit 110 and the clock input of D-type flip-flop 120.

Clock circuit 110 provides a 500 khz clock signal to microprocessor 100. This 500 khz signal is also counted down to a 20 millisecond signal by count down timer 193 which divides by 10,000. This 20 millisecond signal is then applied to the clock input of D-type flip-flop 120, causing it to provide a logic level 0 signal at its $\overline{Q}$ output. This logic level 0 signal is detected at the interrupt (INT) input of control microprocessor 100 which then applies logic level 0 $\overline{IOREQ}$ (I/O request) and $\overline{M1}$ signals to OR gate 131. This OR gate then applies a logic level 0 interrupt acknowledge signal to the clear (CL) input of D-type flip-flop 120. Thus, this flip-flop is available for generating a subsequent interrupt upon receipt of the next 20 millisecond pulse from count down timer 192.

The system software of the present invention is resident in EPROM 160. Control microprocessor 100 accesses this EPROM by applying the requisite address signals on address leads A0–A10. Since the enable (E) input is grounded, the contents of each addressed EPROM location are immediately displayed at EPROM data leads ED0–ED7. To ensure that data is not randomly presented to control microprocessor 100, the data from EPROM 160 is first passed through buffer 190. This buffer is enabled by a logic level 0 signal on lead 190j.

In order to provide such a logic level 0 signal, OR gate 191 must detect logic level 0 signals on both of its inputs. The RAM-lock signal appearing on the first input of this gate is at a logic level 0 when a RAM or EPROM access is being made. Gate 151 provides a logic level 0 signal to the second input of gate 191 when it detects a logic level 0 read ($\overline{RD}$) signal on lead 100g and a logic level 0 signal on address lead A11. By definition these address and read signals are at a logic level 0 when reading from EPROM 160 since it is only accessed by address signals on address leads A0–A10 and a logic level 0 $\overline{RD}$ signal. Thus, gate 191 provides the logic level 0 enable signal in response to a read ($\overline{RD}$) signal and a valid address signal. Buffer 190 then applies the data signals from EPROM 160 to data leads D0–D7 for use by control microprocessor 100.

Similarly, control microprocessor 100 applies address signals on address leads A0–A15 for retrieval and storage of data, via data leads D0–D7, in selected locations of memory in RAM 170. In order to read and write from RAM 170, a logic level 1 or 0 signal, respectively, is applied to the enable input of RAM 170. Gate 181 provides these read and write signals in response to the control signal from gate 183 and a logic level 1 or 0 read or write signal, respectively, on lead 100f. Gate 183 normally provides a logic level 0 control signal, since the RAM-lock signal from the gate circuit (FIG. 2) is at a logic level 0 when RAM 170 is being accessed and the address signal on address lead A11 is always at a logic level 1 for such RAM accesses. Consequently, gate 181 transfers the logic level 1 or 0 read or write signals, respectively, from lead 100f to RAM 170. The data on data leads D0–D7 is then transferred between RAM 170 and control microprocessor 100 in a direction depending on whether a read or write access has been made.

Since the address and data leads are also connected to the speech microprocessor (FIG. 5), the keyboard circuits (FIG. 2), the ringing detector circuit (FIG. 6), and the display groups (FIG. 4), control microprocessor 100 can also read from or write to these devices. The data signals applied to the display groups are inverted by inverter circuit 140 to provide correct polarity for lighting the lamps of these display groups. Control microprocessor 100 reads and writes from the speech microprocessor (FIG. 5) by applying a logic level 1 or 0 read or write signal, respectively, on lead 100f and a logic level 0 I/O request ($\overline{IOREQ}$) signal on lead 100d. Gate 132 then applies corresponding logic level 1 or 0 read or write signal (WRS) to the speech microprocessor (FIG. 5).

Figure 2:
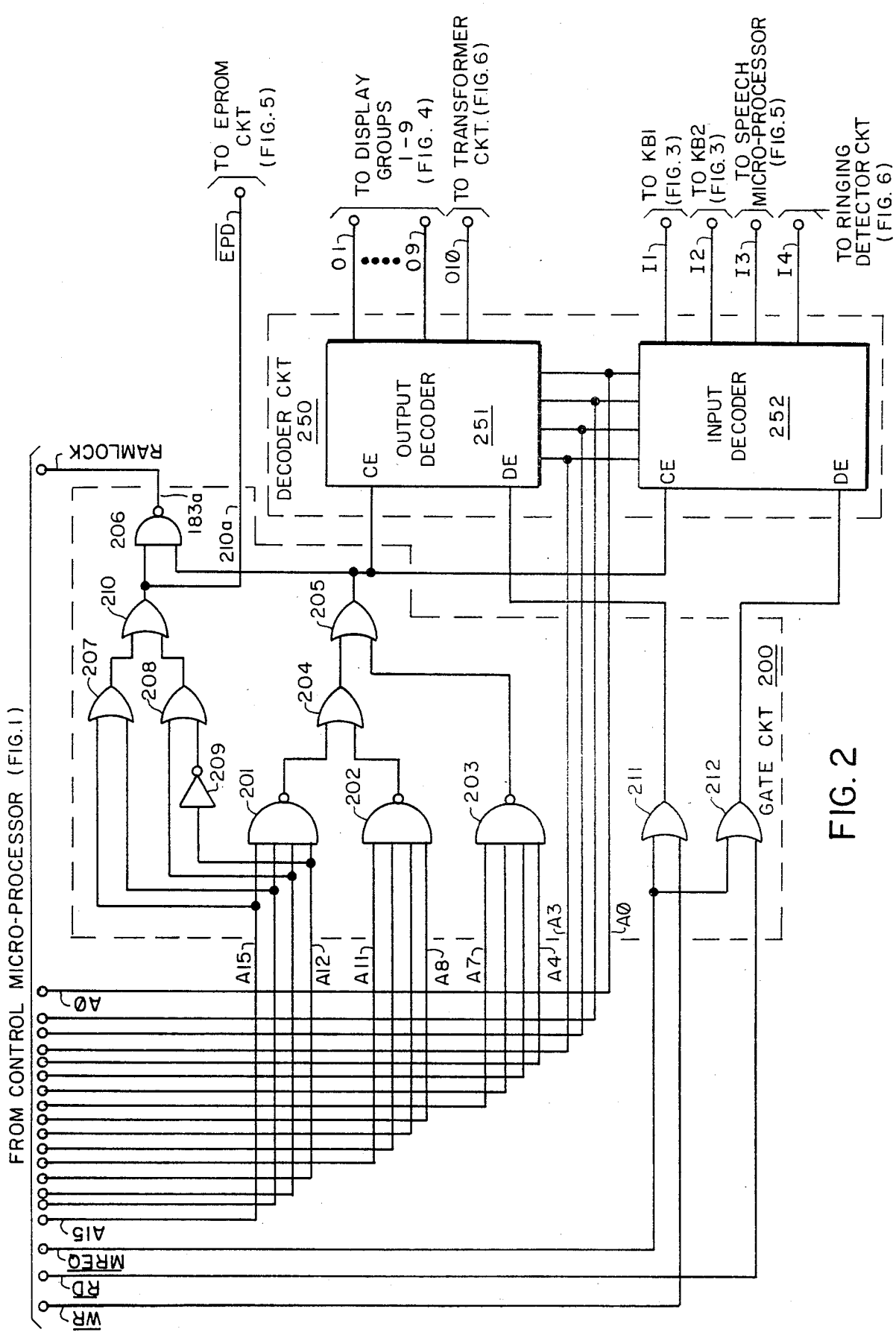
FIG. 2 is a combined logic and block diagram of the address gate and decoder circuits of the present invention.

Control microprocessor 100 is also able to read from the EPROM circuit (FIG. 5), since the address leads A0–A11, the data leads D0–D7 and read ($\overline{RD}$) signal lead 100g are connected to that circuit. Control microprocessor 100 also applies read ($\overline{RD}$), write ($\overline{WR}$), memory request ($\overline{MREQ}$) and address signals to the gate circuit (FIG. 2). When control microprocessor 100 is communicating with the speech microprocessor (FIG. 5), the wait signal which is applied to lead 100a by the speech microprocessor is used to ensure synchronism of data transmissions by requiring control microprocessor 100 to delay any subsequent data transfers until the wait signal is removed.

Referring now to FIG. 2, gate circuit 200 and decoder circuit 250 are shown. Gate circuit 200 includes NAND gates 201–203 which are connected to control microprocessor 100 (FIG. 1) by address leads A4–A15. NAND gates 201 and 202 are further connected to OR gate 204 which is connected to OR gate 205. NAND gate 203 is also connected to OR gate 205 which is further connected to NAND gate 206. OR gate 207 is connected to control microprocessor 100 by address leads A14–A15. OR gate 208 is connected to control microprocessor 100 by address lead A13 and to inverter 209 which is connected to control microprocessor 100 by address lead A12.

OR gates 207 and 208 are connected to OR gate 210 which is further connected to NAND gate 206 and to the EPROM circuit (FIG. 5) by EPROM decode ($\overline{EPD}$) lead 210a. NAND gate 206 is connected to control microprocessor 100 (FIG. 1) by RAM-lock lead 183a. OR gates 211 and 212 are connected to control microprocessor 100 by memory request ($\overline{MREQ}$) lead 100h. OR gates 211 and 212 are also connected to control microprocessor 100 by write ($\overline{WR}$) lead 100f and read ($\overline{RD}$) lead 100g, respectively.

Decoder circuit 250 includes output decoder 251 and input decoder 252. Both of these 4 line to 16 line decoders are connected to control microprocessor 100 by address leads A0–A3. The chip enable (CE) input of both of these decoders is connected to OR gate 205, while the decode enable (DE) input of output decoder 251 is connected to OR gate 211 and the decode enable input of input decoder 252 is connected to OR gate 212.

Output decoder 251 is connected to display groups 1–9 (FIG. 4) by output leads 01–09. This decoder is also connected to the transformer circuit (FIG. 6) by output lead 010. Input decoder 252 is connected to keyboard 1 (FIG. 3) by input lead I1 and to keyboard 2 (FIG. 3) by input lead I2. This decoder is further connected to the speech microprocessor (FIG. 5) by input lead I3 and to the ringing detector circuit (FIG. 6) by input lead I4.

Address space for the control circuit EPROM (CEPROM), the RAM, the speech circuit EPROM (SPEPROM) and the memory mapped I/O circuits is assigned according to the following table.

| ADDRESS SPACE ASSIGNMENT | | | | |
| --- | --- | --- | --- | --- |
| A15–A12 | A11–A8 | A7–A4 | A3–A0 | |
| 0 | 0 | 0 | 0 | CEPROM |
| 0 | 7 | F | F | |
| 0 | 8 | 0 | 0 | RAM |
| 0 | B | F | F | |
| 1 | 0 | 0 | 0 | SPEPROM |
| 1 | F | F | F | |
| F | F | F | 0 | I/O |
| F | F | F | F | |

Gate circuit 200 and decoder circuit 250 are only operative when control microprocessor 100 addresses memory mapped I/O units or the speech EPROM (SPEPROM). When accessing an I/O unit, control microprocessor 100 provides one of the 16 addresses in the FFF0–FFFF range. Gates 201, 202 and 203 detect any address with address bits FFF on address leads A15–A4. These address bits define the address space between addresses FFF0 and FFFF. When these address bits are provided by control microprocessor 100, NAND gates 201, 202 and 203 each provide logic level 0 signals at their outputs. Consequently OR gate 204, and therefore OR gate 205, also provide logic level 0 signals at their outputs. Since OR gate 205 is connected to the chip enable (CE) inputs of decoders 251 and 252, these decoders are enabled upon detection of the FFF address bits on address leads A15–A4.

The control microprocessor defines whether a particular I/O unit (keyboard or display group), the transformer circuit, the speech microprocessor or the ringing detector circuit is to be addressed, based on the data pattern applied to address leads A3–A0. Since both the input and output decoders are enabled in response to the FFF bits on address leads A15–A4 both of these decoders are able to decode address bits on address leads A3–A0. However, only one of these decoders will provide an output signal based on whether a read or write access is made by control microprocessor 100.

The control microprocessor applies logic level 0 memory request ($\overline{MREQ}$) and logic level 0 write ($\overline{WR}$) signals to OR gate 211 in order to write to the display groups or the transformer circuit. Gate circuit 211 then applies a logic level 0 signal to the decoder enable (DF) input of output decoder 251. This decoder then decodes the address bits on address leads A3–A0 and applies a logic level 0 signal to the lead, in the group of leads 01–010, which is connected to the decoded display group or transformer circuit.

Similarly when microprocessor 100 reads from a keyboard, the speech microprocessor or a ringing detector circuit, it applies a logic level 0 memory request ($\overline{MREQ}$) signal and a logic level 0 read ($\overline{RD}$) signal to gate 212. This gate then applies a logic level 0 signal to the decoder enable input (DE) of input decoder 252. This decoder then decodes the address bits on address leads A3–A0 and applies a logic level 0 signal to the lead, in the group of leads I1–I4, which is connected to the selected keyboard, speech microprocessor or ringing detector.

Gates 207, 208 and 210 and inverter 209 decode addresses in the speech EPROM (SPEPROM) address space. Since this address space includes the addresses 1000 to 1FFF, only the leading hexadecimal digit of 1 need be decoded to identify accesses to the SPEPROM. Thus gate 207 is connected to address leads A15 and A14 and gate 208 is connected to address lead A13. This gate is further connected by inverter 209 to address lead A12.

When a hexadecimal digit of 1 is applied to these address leads, logic level zero signals appear on address leads A15–13 and a logic level 1 signal appears on address lead A12. This logic level 1 signal is inverted to a logic level 0 signal by inverter 209. Thus logic level 0 signals appear at the inputs to both gates 207 and 208. These gates then cause logic level 0 signals to appear at the inputs of gate 210. Consequently, a logic level 0 EPROM decode ($\overline{EPD}$) signal appears on lead 210a.

This $\overline{EPD}$ signal enables the EPROM circuit of FIG. 5 for accesses by control microprocessor 100. Such accesses are made to retrieve linear predictive coded data from the SPEPROM. Such data is then formed into a message and transmitted to the speech microprocessor which converts it to an analog message.

This logic level 0 $\overline{EPD}$ signal is also applied to gate 206 along with the logic level 0 signal from gate 205. Thus the logic level 0 signals appearing at the inputs of gate 206 represent access by control microprocessor 100 to either the speech EPROM circuit or memory mapped I/O circuits. In either case, gate 206 provides a logic level 1 RAM-lock signal which inhibits accesses to RAM 170 and EPROM 160 (FIG. 1) when the control microprocessor is accessing the SPEPROM or memory mapped I/O.

Figure 3:
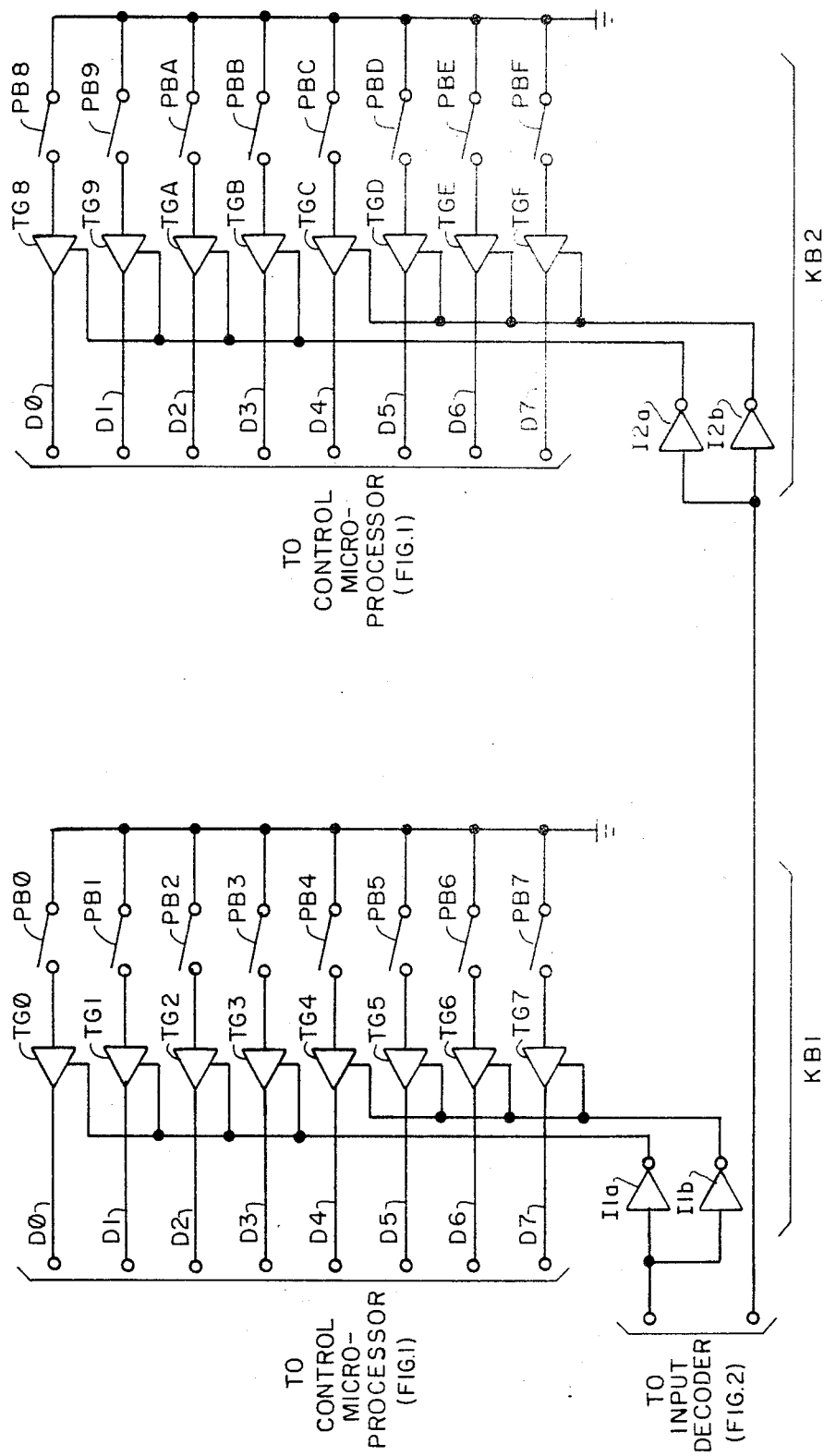
FIG. 3 is a schematic diagram of the key-board circuits of the present invention.

Referring now to FIG. 3, keyboard circuits KB1 and KB2 are shown. Keyboard circuit KB1 includes switch contacts PB0–7 which are connected to associated keypad pushbuttons. Similarly keyboard circuit KB2 includes switches PB8 through PBF which are connected to associated keypad pushbuttons. Each of these switches is connected to ground and to the data input of an associated one of tri-state gates TG0–TGf. Tri-state gates TG0–TG3 have their control input connected to inverter I1a and tri-state gates TG4–TG7 have their control input connected to inverter I1b. Both of these inverters are connected to lead 252a of input decoder 252. Similarly tri-state gates TG8–TGB have their control input connected to inverter I2a and tri-state gates TGC–TGF have their control input connected to inverter I2b. Both of these inverters are connected to input decoder 252 via lead 252b.

Control microprocessor 100 scans the status of these pushbuttons once every 10 milliseconds. Thus if a pushbutton has been depressed, a logic level 0 signal is applied to the data input of the associated tri-state gate. Control microprocessor 100 scans the keyboards by applying a logic level 0 signal to control input of inverters I1a–b or I2a–b depending on whether keyboard (KB) 1 or keyboard (KB) 2 is being scanned. These inverters then apply a logic level 1 signal to the connected tri-state gates which then gate the status of the associated pushbuttons to data leads D0–D7. Since these leads are connected to control microprocessor 100, this microprocessor then receives the status of the pushbuttons.

Figure 4:
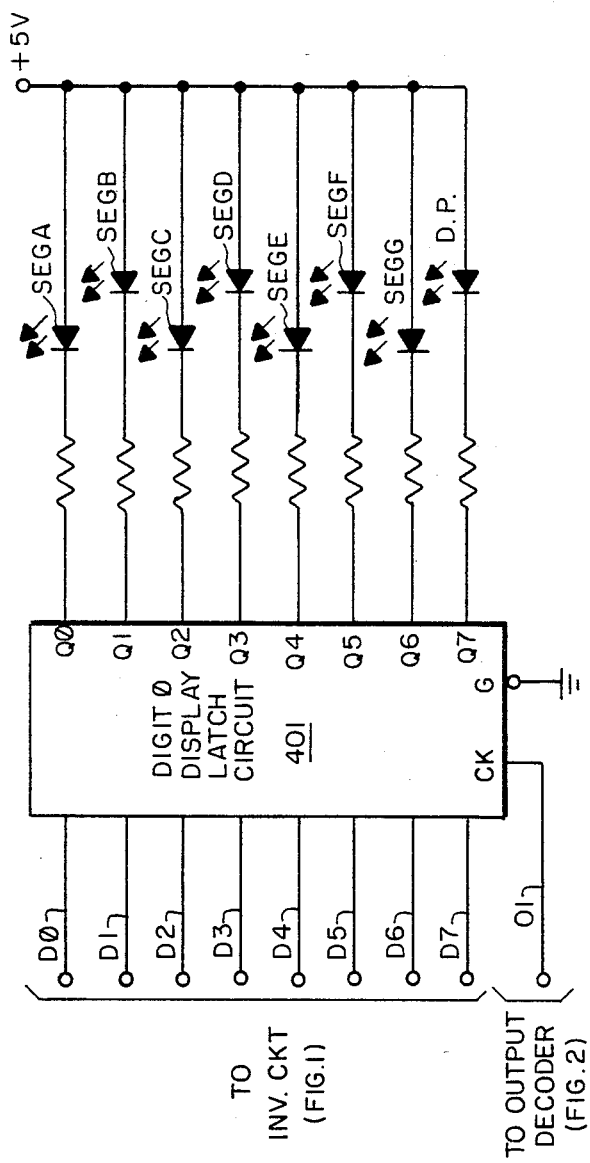
FIG. 4 is a combined block and schematic diagram of the display circuits of the present invention.
Figure 4:
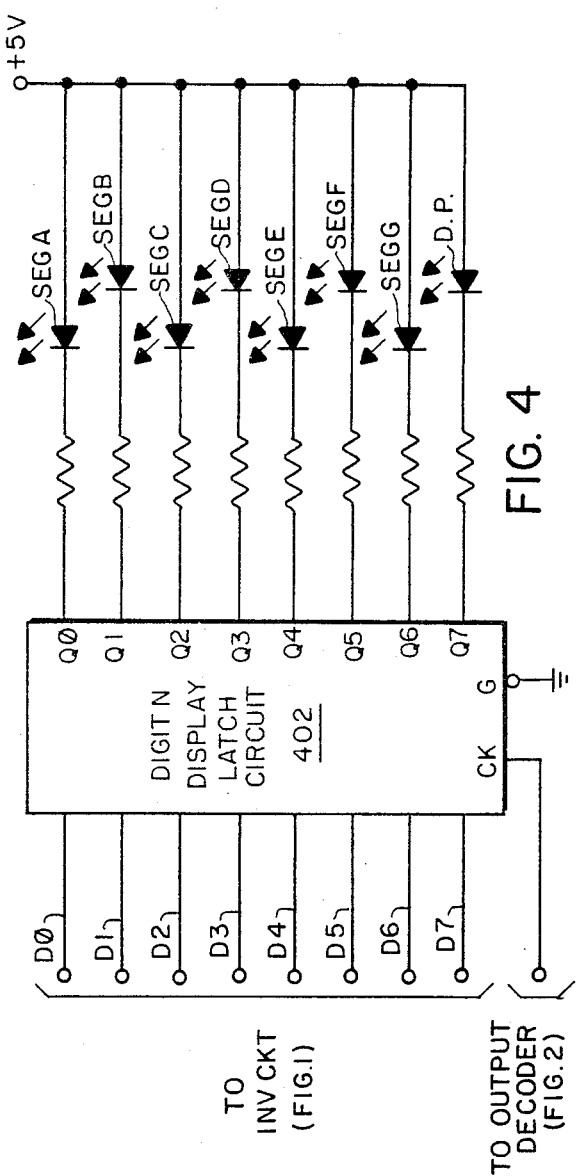
Figure 5:
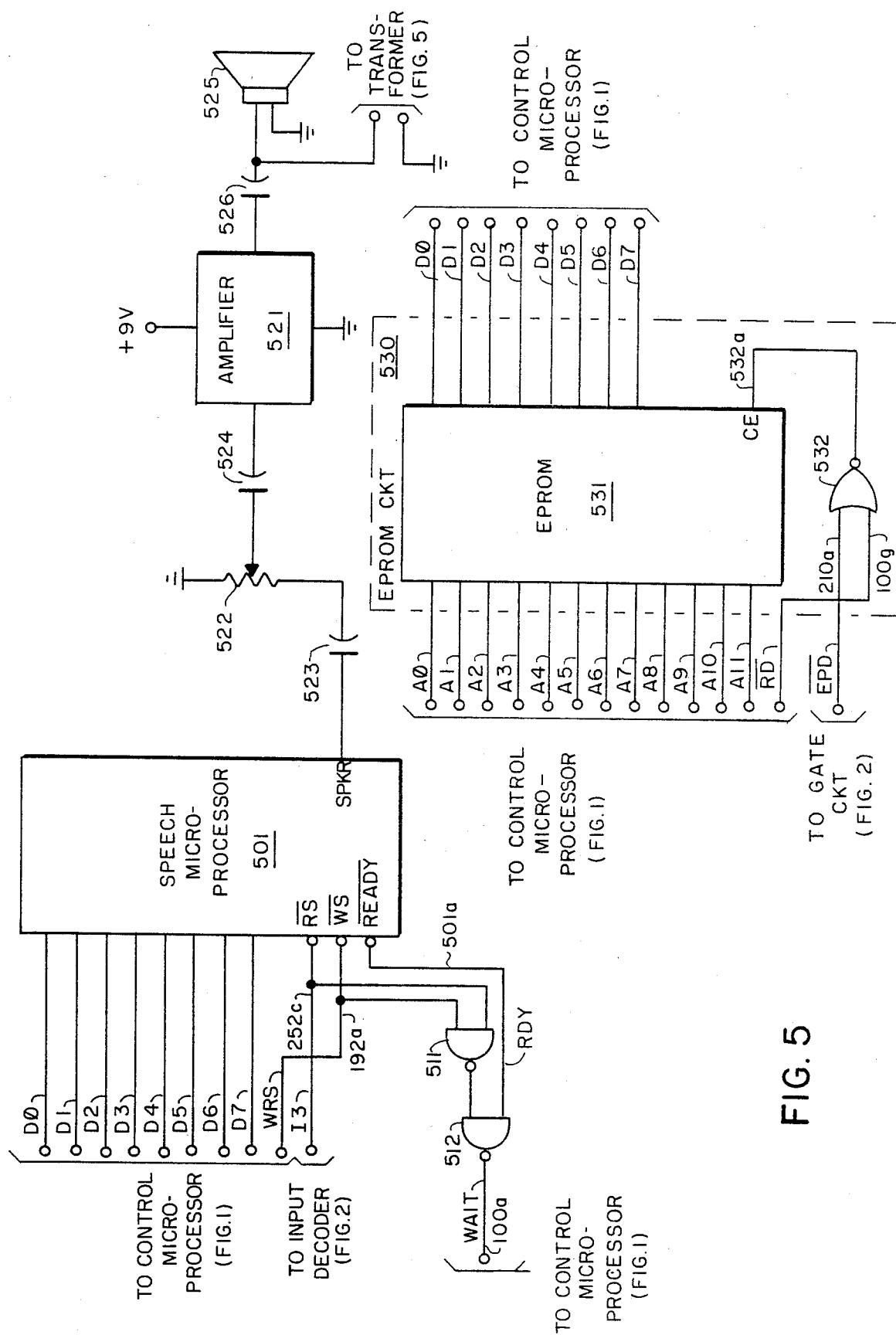
FIG. 5 is a combined block, logic and schematic diagram of the speech processor of the present invention.

Referring now to FIG. 4, the display circuits for digits 0–N are shown. Display latch 401 includes data input leads D0–D7, data output leads Q0–Q7 and clock input CK. This clock input is connected to output decoder 252 via lead 251a. Similarly the other display latches are connected to output decoder 251 by leads 251b–i. The data input leads of display latch 401 are connected to control microprocessor 100. The Q0–Q7 output leads of these display latches are connected via resistors to associated light emitting diodes (LED). Each of these diodes represents 1 to 7 segments, or a decimal point, in a 7 segment lamp display for a particular digit.

Control microprocessor 100 can cause a particular digit to display a numerical value of 0 through 9 and a decimal point by applying the appropriate data bits to data inputs D0–D7 of the display latch associated with that particular digit.

For example, in order to display the number 8 and a decimal point, for the digit 0, control microprocessor 100 would apply the appropriate address bits to output decoder 251, causing a logic level 0 signal to appear at the clock (CK) input of display latch 401. Control microprocessor 100 would also apply logic level 1 signals to each data lead D0–D7 at its output (FIG. 1). These signals would be inverted by inverter circuit 140, causing logic level 0 signals to appear at the data input leads D0–D7 of display latch 401. These logic level 0 signals are then clocked into display latch 401 by the logic level 0 signal appearing on the CK input. Consequently logic level 0 signals would appear on all of the Q0–Q7 outputs, causing all segment lamps (SEGA–SEGF) and the decimal point (DP) lamp to light.

Similarly control microprocessor 100 can cause any decimal number and a decimal point to be displayed at any other digit position by applying appropriate address bits to gate circuit 200, thereby causing decoder 251 to enable the addressed display latch. The data pattern then applied to inverter circuit 140 causes the corresponding decimal number to appear at the enabled digit position.

Referring now to FIG. 5, speech microprocessor 501 is shown connected to control microprocessor 100 (FIG. 1) via data leads D0–D7 and the write speech microprocessor (WRS) lead 192a. This speech microprocessor is further connected to input decoder 252 via input lead I3, to NOR gate 511 via the WRS and I3 leads, and to NOR gate 512 via the ready (RDY) lead. Gate 512 is further connected to the output of gate 511 and it is also connected to control microprocessor 100 via wait lead 100a.

The speaker output of speech microprocessor 501 is connected to amplifier 521 via potentiometer 522 and filter capacitors 523 and 524. This amplifier is further connected to speaker 525 by coupling capacitor 526. Speech EPROM circuit SPEPROM 530 includes EPROM 531 and OR gate 532. ThiS EPROM is connected to control microprocessor 100 (FIG. 1) by address leads A0–A11 and date leads D0–D7. Its chip enable (CE) lead is connected to OR gate 532 which is connected via EPROM disable ($\overline{EPD}$) lead 210a and read ($\overline{RD}$) lead 100g.

EPROM circuit 131 contains the vocabulary for control microprocessor 100. This vocabulary includes speech data that was compressed using pitch-excited linear predictive coding (LPC). When the control microprocessor determines that a message is to be sent, it must first form the message by combining selected words from EPROM 531.

In order to read from this EPROM, control microprocessor 100 applies a logic level 0 read ($\overline{RD}$) signal to lead 100g. A logic level 0 EPROM decode ($\overline{EPD}$) signal is applied to lead 210a when the address space of EPROM 531 is decoded by address circuit 200. Consequently, OR gate 532 applies a logic level 0 chip enable signal to lead 523a. EPROM 531 then decodes the address bits on address leads A0–A11. It then displays the word residing at the identified address on data leads D0–D7. Thus this word is made available to control microprocessor 100 on these leads. Control microprocessor 100 repeatedly performs these accesses until it retrieves the desired words for the intended message.

In order to ensure synchronism in data transmissions between control microprocessor 100 and speech microprocessor 501, control microprocessor 100 monitors the status of the wait signal on lead 100a. A logic level 0 $\overline{wait}$ signal indicates that the speech microprocessor is not ready for access by control microprocessor 100. This logic level 0 $\overline{wait}$ signal is provided by OR gate 512 in response to a logic level 1 signal appearing on both of its inputs. These inputs are connected to ready lead 501a and NAND gate 511. Therefore, the logic level 0 $\overline{wait}$ signal is generated in response to a logic leve 1 $\overline{ready}$ signal and a logic level 1 signal from NAND gate 511. NAND gate 511 provides this logic level 1 signal in response to a logic level 0 read or write signal on leads 252c and 192a, respectively. Thus control microprocessor 100 is informed to delay access to speech microprocessor 501 whenever the speech microprocessor is not ready, as indicated by a logic level 1 $\overline{ready}$ signal, and control microprocessor 100 has not yet completed a previous read or write access to the speech microprocessor, as indicated by a logic level 0 signal on leads 252c or 192a, respectively.

Control microprocessor 100 applies read commands to speech microprocessor 501 in order to check the status of the speech microprocessor. This status check is made to ensure that data is provided to the speech microprocessor as it needs it for message transmission. The control microprocessor must first get the status from the speech microprocessor to see if it is available to talk. When the speech microprocessor is so available, the control microprocessor transmits a command to the speech microprocessor, specifying that it should go into the "talk external" mode of operation. Control microprocessor 100 then sends a byte of the compressed speech data to the speech microprocessor 501. The speech microprocessor has a FIFO memory in it which must be half filled with data before it will start sending out analog signals representative of the audible speech message. Once the speech microprocessor begins sending these analog signals, the control microprocessor must continue sending additional bytes of data until the word to be spoken is completely transmitted.

Speech microprocessor 501 then applies analog signals, representative of the message to be transmitted, to amplifier 521. These amplified signals are then applied to speaker 525 which generates the audible representation of the message sent by microprocessor 100. Potentiometer 522 is used to control the volume of the resultant audible signal. EPROM 531 can be used to store the LPC code of any words that are desired. This EPROM is typically a Texas Instruments TMS2532 and the digital representation of data to be stored therein is provided by commercial organizations, such as Texas Instruments. Speech microprocessor 501 is also a Texas Instruments circuit. This circuit is identified as TMS 5200. Amplifier 521 is a National Semiconductor circuit and it is identified as LM380.

Figure 6:
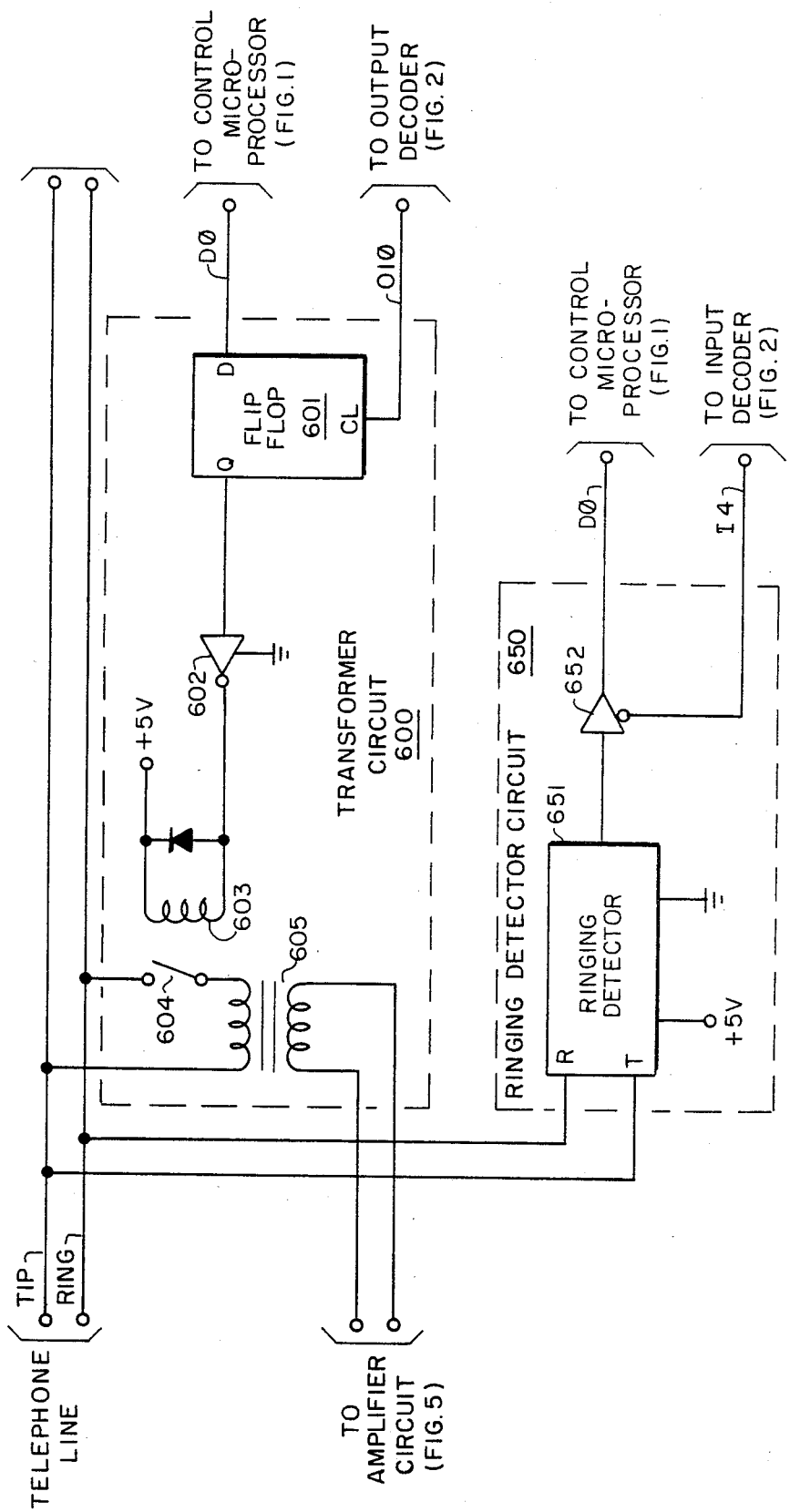
FIG. 6 is a combined block, logic and schematic diagram of the transformer and ringing detector circuits of the present invention.

Referring now to FIG. 6, transformer circuit 600 is shown connected to amplifier 521 (FIG. 5), to output decoder 251 (FIG. 4) and control microprocessor 100 (FIG. 1). Transformer circuit 600 includes D-type flip-flop 601 which has a data input connected to the data lead D0 of control microprocessor 100, and a clock lead connected to output lead 010 of output decoder 251. The Q output of this D-type flip-flop is connected to relay driver 602 which is connected to relay coil 603. This transformer circuit further includes transformer 605 connected between amplifier circuit 521 and to the telephone line.

When the message transmitted by control microprocessor 100 are to be transmitted over the telephone line, amplifier 521 must be electrically connected to that telephone line. In order to do this, control microprocessor 100 provides the appropriate address signals on address leads A0–A15, to cause output decoder 251 to apply a logic level 0 signal to lead 010. Control microprocessor 100 also applies a logic level 1 signal to data lead D0. D-type flip-flop 601 then stores this logic level 1 data signal upon receipt of the logic level 0 signal from decoder 251. This stored logic level 1 signal then appears at the Q output of D-type flip-flop 601 and causes relay driver 602 to apply a logic level 0 signal to relay coil 603. This relay coil then generates a magnetic flux which causes switch 604 to close, thereby connecting transformer 605 to the tip and ring leads of the telephone line.

Thus, when control microprocessor 100 transmits a message to a remote connection by the telephone line it not only causes speech microprocessor 501 to apply an analog representation of the message to transformer 605, but it also causes relay contact 604 to be closed, via D-type flip-flop 601 and driver 602, in order to connect transformer 605 to the telephone line.

Ringing detector circuit 650 includes ringing detector 651 and tri-state gate 652. Ringing detector 651 is connected to the telephone line and to the data input of tri-state gate 652. The control input of this gate is connected to input decoder 252 via input lead I4. The output of tri-state gate 652 is connected to control microprocessor 100 (FIG. 1) via data lead D0. Ringing detector 651 typically includes a coil connected in magnetic field proximity to a Hall Effect device.

When ringing current is present, that current causes the ringing detector coil to generate a magnetic flux which is detected by the Hall Effect device. This device then sends a logic level 1 signal to tri-state gate 652. Microprocessor 100 scans the ringing detection status of the telephone line by applying the address signal representative of the ringing detector circuit to gate circuit 200 and input decoder 252. This decoder then applies a logic level 0 signal to input lead I4, thereby enabling tri-state gate 652 to gate the status of ringing detector 651 to control microprocessor 100.

This circuit of the present invention can be used as a voice synthesized telephone answering circuit or time anouncement circuit. When implemented as a voice answer circuit, the vocabulary stored in EPROM 531 (FIG. 5) includes words representative of the desired message to be provided when the called telephone subscriber is not available. Under this arrangement control microprocessor 100 retrieves selected message words from EPROM 531 and concatenates then into the telephone answering message. It also causes relay contact 604 to close (FIG. 6) thereby terminating the telephone line through 600 ohm transformer 605 and coupling amplifier 521 to the line. It then transfers the message to the speech microprocessor and causes it to transmit the voice synthesized automatic telephone answering message to the calling subscriber.

When this circuit is implemented as a voice synthesized time announcement circuit, the vocabulary stored in EPROM 531 (FIG. 5) includes data representative of selected time increments and generic time announcement words. With this arrangement, control microprocessor 501 formulates the time announcement message by retrieving selected words and data from EPROM 531. It then causes speech microprocessor 501 to apply it to the local speaker 525. The request for a time announcement can be made locally via the keyboard pushbuttons, remotely by application of ringing current to the telephone line, or automatically in response to predetermined interrupts from count down timer 192 and D-type flip-flop 120 (FIG. 1).

Thus, the present invention discloses a novel arrangement for providing voice synthesized automatic telephone answering messages and voice synthesized time announcement messages through a control microprocessor, memory mapped I/O circuits, keyboard and display circuits, a speech microprocessor, an EPROM, with linear predictive coded data representing the vocabulary for the messages, a ringing detector and a transformer circuit.

It will be obvious to those skilled in the art that numerous modifications of the present invention can be made without departing from the spirit of the invention, which shall be limited only by the scope of the claims appended hereto.

What is claimed is:

1. A voice synthesized telephone answering circuit for use in a communication system which includes a calling telephone station and a telephone line, said calling telephone station being operative to cause said communication system to apply a ringing signal to said telephone line, said telephone answering circuit comprising:

vocabulary storage means operative to store digital representations of a predetermined group of words;

a ringing detector, connected to said telephone line and operative in response to said ringing signal to provide a ringing detected signal;

message storage means;

a first microprocessor connected to said message storage means;

decoding means connected to said first microprocessor;

said first microprocessor being operative to provide address signals representative of a speech processor, said ringing detector, and storage locations of said vocabulary storage means;

said decoding means being operative to provide corresponding enable signals for said speech processor, ringing detector and vocabulary storage means, respectively;

said first microprocessor being connected to said ringing detector and said vocabulary storage means via said decoding means, and operative in response to said ringing detected signal to retrieve selected ones of said digital words from said vocabulary storage means, and further operative to concatenate said retrieved words into a digital telephone answering message and store it in said message storage means;

said speech processor being connected to said first microprocessor via said decoding means;

said first microprocessor being further operative to retrieve said digital telephone answering message from said message storage means and transmit it to said speech processor;

said speech processor being operative in response to said digital telephone answering message to apply a corresponding analog telephone answering message to said telephone line;

whereby said calling telephone station receives a voice synthesized telephone answering message in response to causing application of ringing current to said telephone line.

2. A telephone answering circuit as claimed in claim 1, wherein said vocabulary storage means comprises an electrically alterable, programmable read-only-memory, operative to store pitch-excited, linear predictive coded, digital representations of said group of words.

3. A telephone answering circuit as claimed in claim 1, wherein said message storage means comprises a random-access-memory.

4. A telephone answering circuit as claimed in claim 1, wherein said decoding means is further operative in response to said address signals representative of said ringing detector, vocabulary storage means and speech processor to disable accesses to said message storage means.

5. A telephone answering circuit as claimed in claim 1, wherein said speech processor comprises:
- a second microprocessor operative to provide said analog representations of said digital telephone answering message;
- an amplifier connected to said second microprocessor and operative to amplify said analog representations of said digital telephone answering message; said analog telephone answering message comprising said amplified analog representations of said digital telephone answering message;
- said first microprocessor being further operative to provide an address signal representative of a transformer circuit; said decoding means being operative in response to said transformer circuit address signal to provide a transformer enable signal; said first microprocessor being further operative to provide a transformer connect signal; and
- a transformer circuit connected between said amplifier and said telephone line and operative in response to said transformer enable and connect signals to couple said analog telephone answering message onto said telephone line.

6. A telephone answering circuit as claimed in claim 5, wherein said decoding means is further operative in response to said transformer circuit address signal to disable said message storage means.

7. A telephone answering circuit as claimed in claim 5, wherein said transformer circuit comprises:
- a D-type flip-flop connected to said first microprocessor and said decoding means, and operative in response to said transformer enable signal to store said transformer connect signal and provide a relay enable signal;
- a transformer connected to said speech processor and connectable to said telephone line; and
- a relay connected to said D-type flip-flop and operative in response to said relay enable signal to connect said transformer to said telephone line.

* * * * *